United States Patent
Koseki et al.

[19]

[11] Patent Number: 6,142,801

[45] Date of Patent: Nov. 7, 2000

[54] PC CARD CONNECTOR

[75] Inventors: Yoshitsugu Koseki, Nagano, Japan; Ming-Chun Lai, Hsin-Chuang; Hung-Chi Yu, Hsi-Chih, both of Taiwan

[73] Assignee: Hon Hai Precision Ind. Co., Ltd., Taipei Hsien, Taiwan

[21] Appl. No.: 09/378,603

[22] Filed: Aug. 20, 1999

[30] Foreign Application Priority Data

Feb. 11, 1999 [TW] Taiwan ................................. 88202430

[51] Int. Cl.⁷ ..................................................... H01R 13/62
[52] U.S. Cl. ............................................................ 439/159
[58] Field of Search ................................... 439/159, 160, 439/64, 152–158

[56] References Cited

U.S. PATENT DOCUMENTS

| | | | |
|---|---|---|---|
| 5,536,180 | 7/1996 | Ishida et al. | 439/159 |
| 5,575,669 | 11/1996 | Lin et al. | 439/160 |
| 5,695,351 | 12/1997 | Kimura et al. | 439/159 |
| 5,846,096 | 12/1998 | Ishida | 439/159 |
| 5,967,813 | 10/1999 | Ho et al. | 439/159 |

*Primary Examiner*—Gary F. Paumen
*Attorney, Agent, or Firm*—Wei Te Chung

[57] ABSTRACT

A PC card connector comprises a header connector, a shielding cover and an ejection mechanism. The ejection mechanism includes ejection means and actuation means. The ejection means is adapted to eject a fully inserted PC card from the header connector. The actuation means includes an elongate base and an elongate rod received in the base. A slider is moveably mounted between the base and the rod. The rod defines a recess for receiving the slider and forms an inclined inner surface for downwardly pressing against the slider thereby preventing the slider from becoming disengaged from the base. The ejection mechanism further includes a jacketing member adapted to receive the rod and the base of the actuation means. The jacketing member forms a number of latches along side edges thereof for engaging with a side wall of the shielding cover thereby securing the actuation means thereto.

8 Claims, 6 Drawing Sheets

PC CARD CONNECTOR

BACKGROUND OF THE INVENTION

The present invention generally relates to a PC (Personal Computer) card connector, and particularly to the PC card connector having a reliable and replaceable ejection mechanism.

A PC card connector is commonly disposed in a notebook computer or other compact electrical devices for electrically engaging with a PC card. The PC card such as a network card, a memory card, or a video card can be inserted into or ejected from the PC card connector. Thus, the PC card connector can serve many functions without compromising space within the notebook computer. The PC card connector includes a number of contacts for signal transmission which usually mate with the PC card with a high retention force. In addition, the PC card connector and the inserted PC card are completely disposed within the computer thereby impeding manual withdrawal of the PC card.

A one-step ejection mechanism is commonly adapted in the PC card connector for ejecting the PC card therefrom. Such an ejection mechanism mounted to one side of the PC card connector includes an ejector lever pivotally mounted to an insulative housing of the PC card connector and a rod pivotally connected to the ejector lever. The rod is manually activated to pivot the ejector lever thereby ejecting the PC card out of the PC card connector. However, when the PC card is fully inserted into the PC card connector, the rod is pushed by the ejector lever to partially extend out of the computer. An external force may inadvertently act on the exposed rod thereby possibly adversely affecting operation of the PC card connector or damaging of the rod.

Two step ejection mechanisms are adopted to solve the above-mentioned problems. Referring to FIGS. 1 and 2, a PC card connector has a side portion 1 with a conventional two step ejection mechanism 2 assembled thereto. The ejection mechanism 2 includes a rod 21, a base portion 22 integrally mounted to the side portion 1 of the PC card connector, a spring 23, a cover 24 and ejection means 25. The rod 21 is moveably received in the base portion 22 and elastically abuts against one end of the spring 23 which is also received in the base portion 22. The rod 21 has an actuation portion 210 extending from the base portion 22 for being manually pushed and a fastener 211 downwardly extending therefrom.

The ejection mechanism 2 further includes an insulative slider 221 and a metal leaf spring 220. The slider 221 serving as a cam includes a pin 223 downwardly projecting therefrom proximate one end thereof and a hole 222 defined therethrough proximate another end thereof. The leaf spring 220 defines an aperture (not shown) therethrough. In assembly, the fastener 211 of the rod 21 extends through the aperture of the leaf spring 220 and the hole 222 of the slider 221 for mounting the slider 221 and the leaf spring 220 together to the base portion 22. The pin 223 of the slider 221 moveably received in a groove (not shown) defined in the base portion 22 which is known in the prior art. The leaf spring 220 is adapted to downwardly abut against the slider 221 thereby preventing the pin 223 of the slider 221 from becoming disengaged from the groove of the base portion 22. The ejection means 25 moveably mounted in the base portion 22 can be pushed by the slider 221.

When a PC card (not shown) is fully inserted into the PC card connector, the rod 21 causes the spring 23 to contract to a minimum length whereby the rod 21 is fully received in the base portion 22. When the PC card is required to be ejected out of the PC card connector, the rod 21 is manually pushed inward and the spring expands to outwardly push the rod 21. The rod 21 is then inwardly pushed again to actuate the ejection means 25 and eject the PC card out of the PC card connector. The spring 23 once again contracts to the minimum length whereby the rod 21 is fully received in the base portion 22.

However, the fastener 211 of the rod 21 is likely to be damaged due to external force or excess vibration. Furthermore, once components of the ejection mechanism 2 are damaged or require replacement, the whole PC card connector must be abandoned since the base portion 22 is integrally mounted to the side portion 1 of the PC card connector. Thus, a PC card connector having a reliable and replaceable ejection mechanism is desired.

SUMMARY OF THE INVENTION

Accordingly, a first purpose of the present invention is to provide a PC card connector having a reliable ejection mechanism.

A second purpose of the present invention is to provide a PC card connector having a replaceable ejection mechanism.

To fulfill the above-mentioned purposes, a PC card connector in accordance with the present invention comprises a header connector, a shielding cover and an ejection mechanism. The ejection mechanism includes ejection means and actuation means. The ejection means is adapted to eject a fully inserted PC card from the header connector. The actuation means includes an elongate base and an elongate rod received in the base. A slider is moveably mounted between the base and the rod. The rod defines a recess for receiving the slider and forms an inclined inner surface for downwardly pressing against the slider thereby preventing the slider from becoming disengaged from the base.

The ejection mechanism further includes a jacketing member adapted to receive the rod and the base of the actuation means. The jacketing member forms a plurality of latches along side edges thereof for engaging with a side wall of the shielding cover thereby securing the actuation means thereto. It is readily apparent that the actuation means can be easily engaged or disengaged with the shielding cover thereby facilitating reparation or replacement thereof.

DETAILED DESCRIPTION OF THE PREFERRED EMBODIMENT

Figure 1:
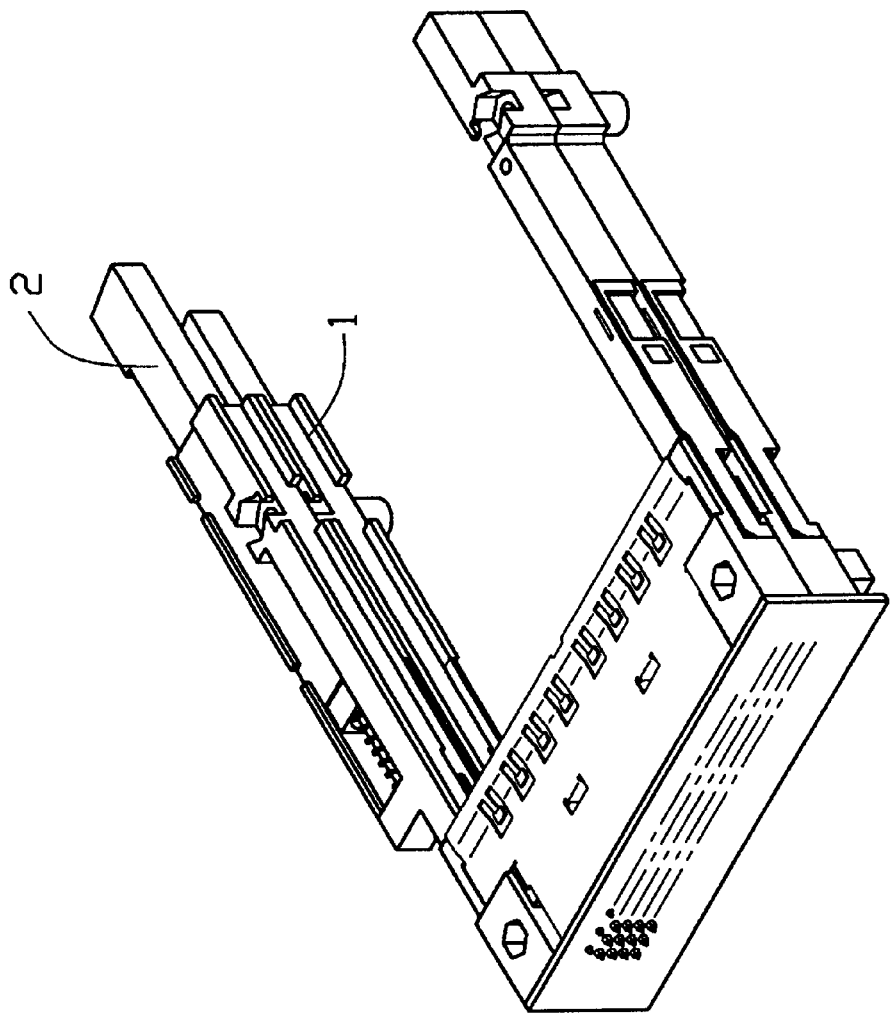
FIG. 1 is a perspective view of a conventional PC card connector.
Figure 2:
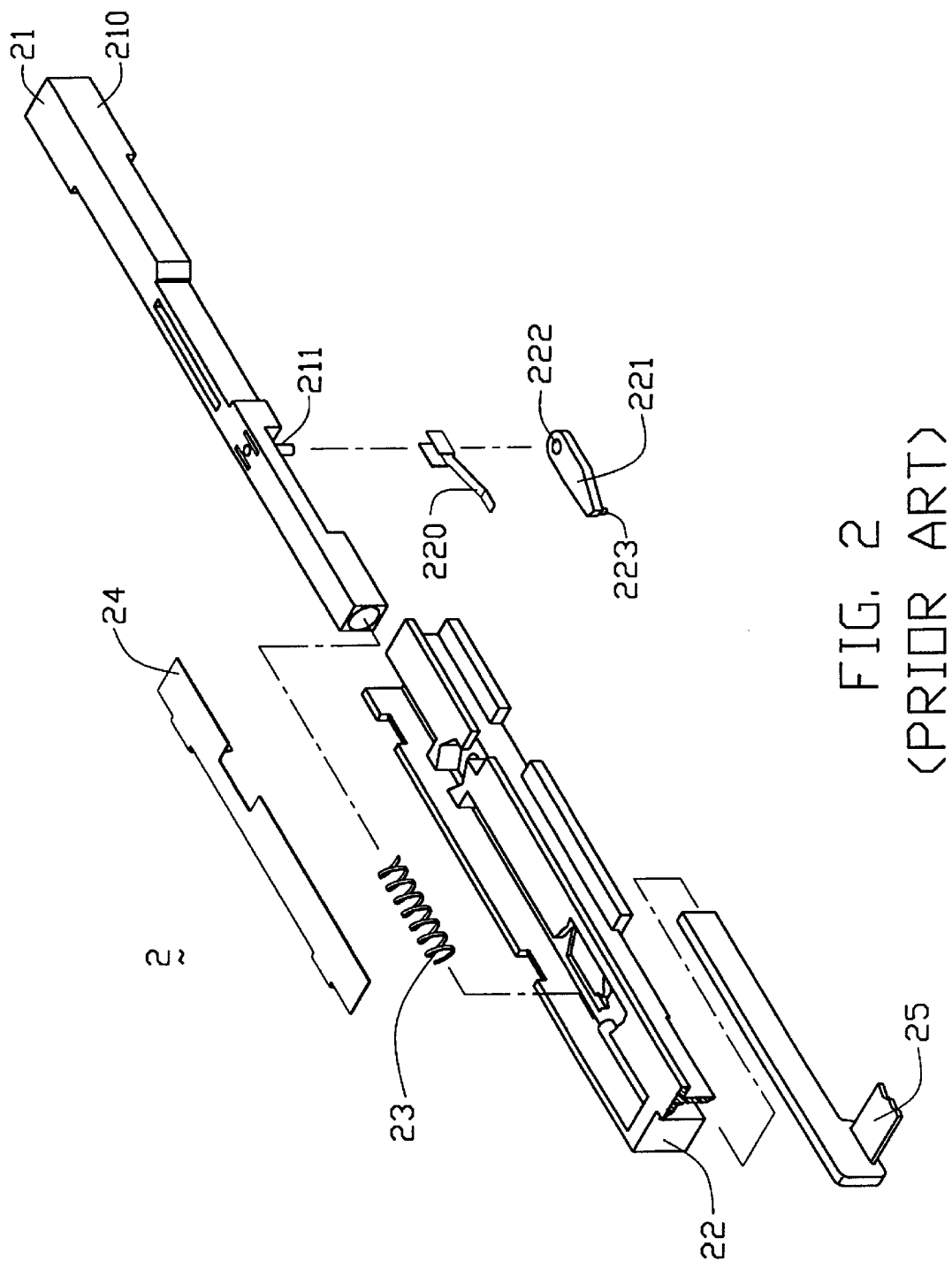
FIG. 2 is an exploded view of ejection mechanism of the conventional PC card connector.
Figure 3:
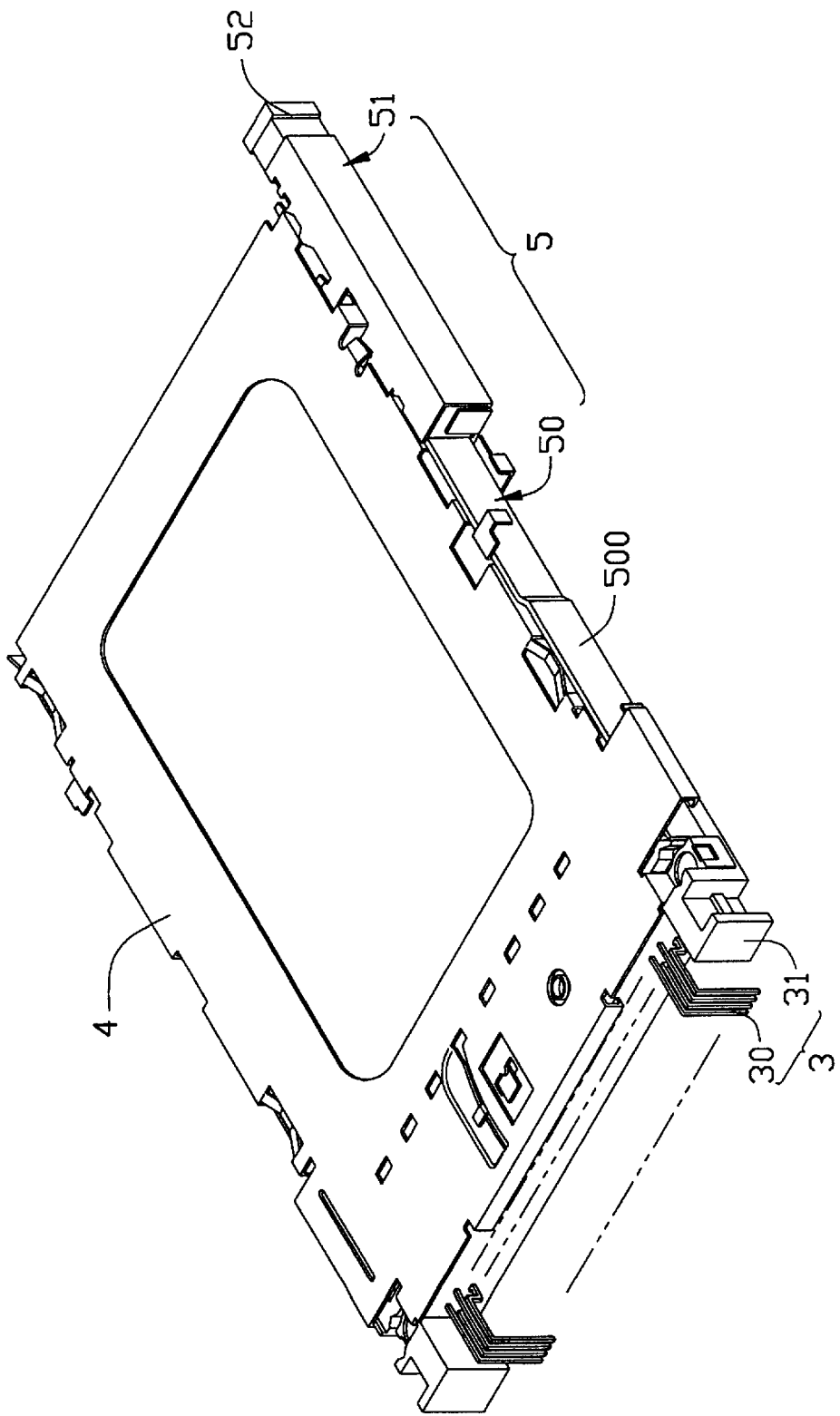
FIG. 3 is a perspective view of a PC card connector of the present invention.

Referring to FIG. 3, a PC card connector in accordance with the present invention comprises a header connector 3, a shielding cover 4 and an ejection mechanism 5. The head connector 3 includes an insulative housing 31 and a plurality of conductive terminals 30 retained in the housing 31 for signal transmission purposes. The shielding cover 4 is attached to a top of the PC card connector for shielding the PC card connector and an inserted PC card (not shown) from external interference signals.

The ejection mechanism 5 includes ejection means 50 and actuation means 51. The ejection means 50 includes a first lever (not shown) and a second lever 500. The first lever is arranged substantially parallel to the longitudinal direction of the header connector 3 and pivotally mounted to the housing 31 thereof for ejecting the PC card out of the PC card connector. The second lever 500 is pivotally connected to one end of the first lever for actuating the first lever.

Figure 4:
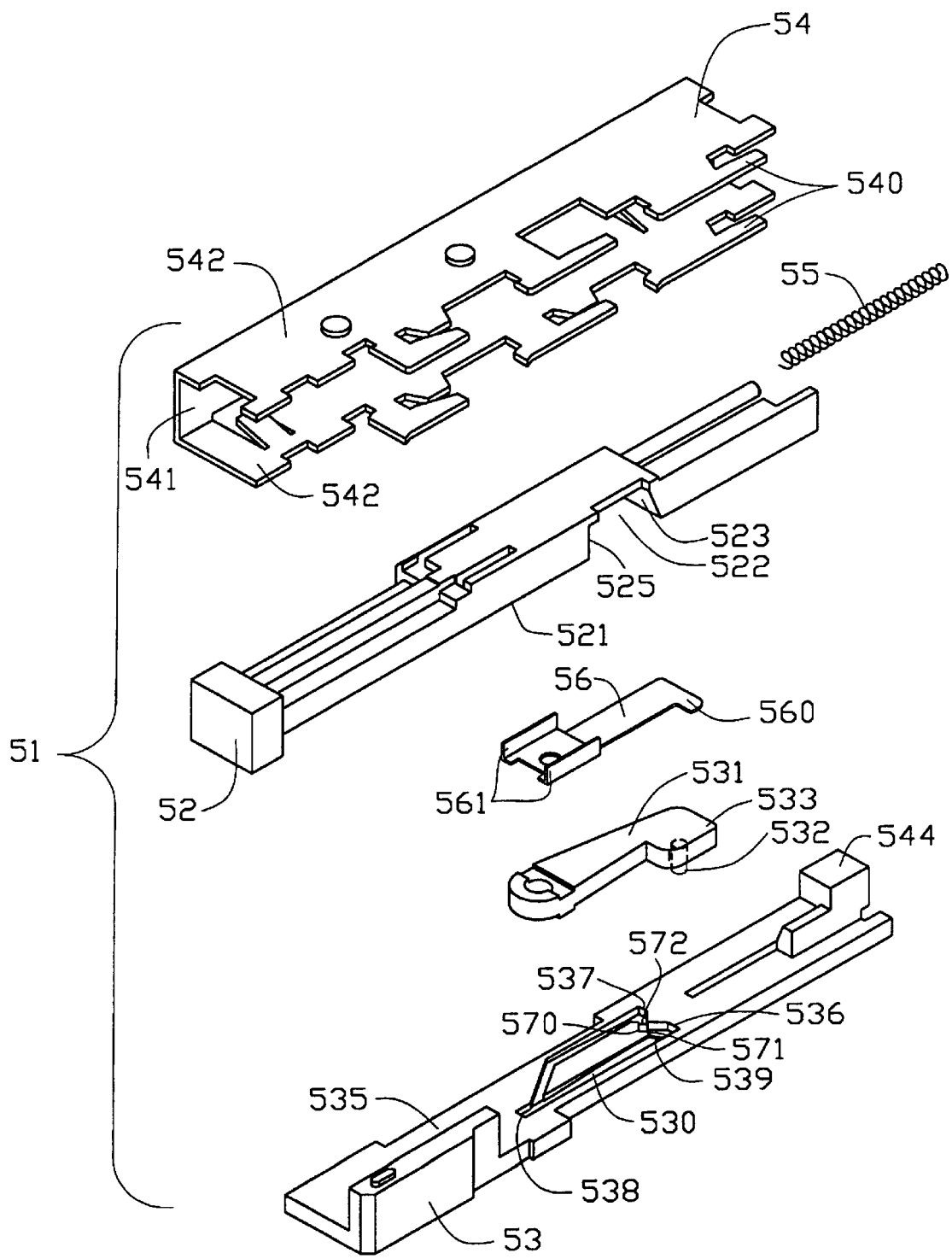
FIG. 4 is an exploded view of an ejection mechanism of the PC card connector with an ejector lever omitted therefrom.

Also referring to FIG. 4, the actuation means 51 includes an insulative base 53, a rod 52, a spring 55, a leaf spring 56, a cam slider 531 and a jacketing member 54. The base 53 defines a heart-shaped channel 530 in a top surface 535 thereof. The rod 52 defines a recess 522 in a bottom surface 521 thereof and a groove 525 in communication with the recess 522. The recess 522 has an inclined inner surface 523. An obtuse angle is formed between the inclined surface 523 and a top surface of the recess 522. The leaf spring 56 includes an elongate tab 560 and a pair of projection portions 561 for being mounted to a top inner wall of the groove 525. The slider 531 includes a convex portion 533 and a downwardly projection pin 532. The pin 532 of the slider 531 is slidably received in the heart-shaped channel 530 of the base 53. The leaf spring 56 is adapted to downwardly press the slider 531 thereby preventing the pin 532 of the slider 531 from becoming disengaged from the heart-shaped channel 530.

Figure 5:
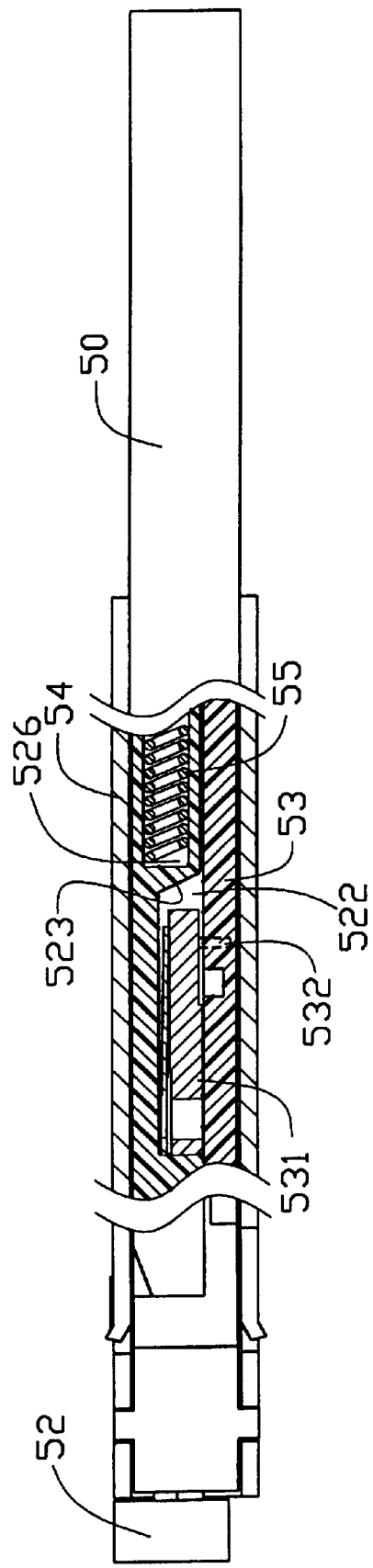
FIG. 5 is a partial cross-sectional view of the PC card connector of the present invention.
Figure 6:
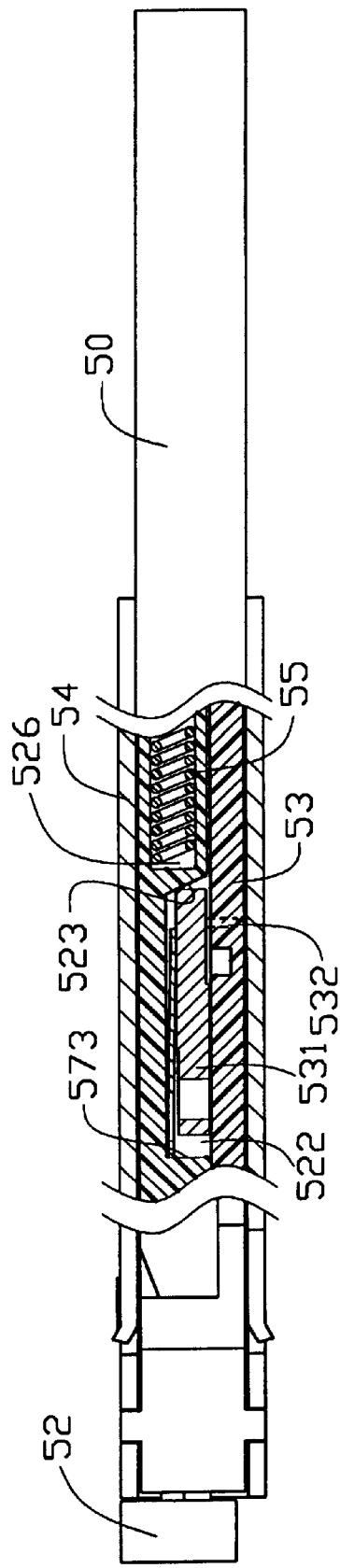
FIG. 6 is similar to FIG. 5 with a rod thereof located at a different portion.

Also referring FIGS. 5 and 6, the rod 52 defines a tunnel 526 for receiving the spring 55. One end of the spring 55 abuts against the end of the tunnel 526 and another end thereof abuts against a stop portion 544 of the base 53 thereby providing elastic contact between the base 53 and the rod 52. The jacketing member 54 is adapted to receive the rod 52 and the base 53. The jacketing member 54 includes a central wall 541 and a pair of side walls 542 extending from opposite edges of the central wall 541. Each side wall 542 forms a plurality of latches 540 along edges thereof for engaging with a side of the shielding cover 4 thereby securing the actuation means 51 thereto. It is readily apparent that the actuation means 51 is easily engaged or disengaged with the shielding cover 4 thereby facilitating reparation or replacement thereof.

When the PC card is fully inserted into the PC card connector, the rod 52 causes the spring 55 to contract to a minimum value. The elastic recovery force of the spring 55 exerts on the rod 52. The inclined surface 523 urges an edge of the convex portion 533 with a force F1 perpendicular to the inclined surface 523. Such a force F1 can be separated into a horizontal force F2 and a vertical force F3. The horizontal force F2 outwardly pushes the slider 531 to fix the pin 532 in a first notch 570 of the heart-shaped channel 530. The vertical force F3 downwardly presses against the edge of the convex portion 533 of the slide 531 to prevent the pin 532 from disengagement of the groove 530. To eject the PC card, the rod 52 is manually pushed inward. An inner end 573 of the recess 522 of the rod 52 inwardly pushes the slider 531 thereby causing the pin 532 to move from the first notch 570 to a second notch 537. During such a process, a first step 571 is formed in the channel 530 for preventing the pin 532 from moving to a third groove 536. Similarly, a second step 572 is formed in the groove 530 for preventing the pin 532 of the slider 531 from moving back to the first notch 570. The spring 55 expands to a maximum length thereby outwardly pushing the rod 52. The inclined inner surface 523 outwardly pushes the slider 531 until the pin 532 is located in a fourth notch 538. The rod 52 is then manually pushed again thereby causing the pin 532 of the slider 531 to move from the fourth notch 538 to the third notch 536. During such a process, the convex portion 533 of the slider inwardly pushes the second lever 500 of the ejection means 50. The second lever 500 then pivotally pushes the first lever to eject the PC card out of the header connector 3. A third step 574 is formed in the channel 530 for preventing the pin 532 from moving back to the second notch 537. The spring 55 contracts to the minimum length once again. The elastic recovery force of the spring 55 causes the pin 532 to move from the third notch 536 to the first notch 570. A fourth step 539 is formed in the channel 530 for preventing the pin 532 from moving back to the third notch 536.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. A PC card connector for providing electrical connection between a PC card and a circuit board, comprising:

a header connector including an insulative housing and a plurality of terminals retained in the housing;

a shielding cover attached to a side of the header connector for shielding the PC card connector and an inserted PC card;

ejection means assembled to the shielding cover and being adapted to eject the fully inserted PC card from the header connector;

a bracket secured to a lateral edge of the shielding cover and including a central wall, an upper side wall and a lower side wall;

an elongate base received in the bracket and defining a cam channel;

an elongate rod movably attached to the base and received in the bracket, the rod defining a groove and a recess in a bottom surface thereof, the groove being in communication with the recess;

a spring provided between the base and the rod;

a slider being movably received in the groove and including a pin slidably received in the cam channel, the slider having a leading end proximate the pin and a rear end opposite the leading end, the slider being adapted to push one end of the ejection means to eject the PC card; and an inclined inner surface formed in the recess, wherein at a first position where the rod is about to be manually pushed in the bracket and compress the spring, an inner end of the groove presses against the rear end of the slider, and wherein at a second position where the rod is about to be projected out of the bracket by the spring, the inclined surface presses against the leading end of the slider;

wherein the slider includes a convex portion, and the inclined surface urges an edge of the convex portion with a force perpendicular to the inclined surface wherein a horizontal component of the force outwardly pushes the slider and a vertical component of the force downwardly presses against the edge of the convex portion of the slider;

wherein a leaf spring is provided between the rod and the slider, the leaf spring including one end fixed in an inner top wall of the groove and another end downwardly pressing against the slider.

2. The PC card connector as claimed in claim 1, wherein the inclined surface and a top surface of the recess forms an obtuse angle.

3. The PC card connector as claimed in claim 1, wherein the cam channel is heart-shaped.

4. The PC card connector as claimed in claim 3, wherein the channel forms a plurality of steps and notches for allowing the pin of the slider to nonreversingly move therein.

5. An ejection mechanism disposed in a PC card connector, the PC card connector providing electrical connection between a PC card and a circuit board, a shielding cover being attached to a side of the PC card connector for shielding the PC card connector and the inserted PC card, the ejection mechanism comprising:

ejection means assembled to the shielding cover and being adapted to eject the fully inserted PC card from the header connector;

a bracket secured to a lateral edge of the shielding cover and including a central wall, an upper side wall and a lower side wall;

an elongate base received in the bracket and defining a cam channel;

an elongate rod movably attached to the base and received in the bracket, the rod defining a groove and a recess in a bottom surface thereof, the groove being in communication with the recess;

a spring provided between the base and the rod;

a slider being movably received in the groove and including a pin slidably received in the cam channel, the slider having a leading end proximate the pin and a rear end opposite the leading end, the slider being adapted to push one end of the ejection means to eject the PC card; and an inclined inner surface formed in the recess, wherein at a first position where the rod is about to be manually pushed in the bracket and compress the spring, an inner end of the groove presses against the rear end of the slider, and wherein at a second position where the rod is about to be projected out of the bracket by the spring, the inclined surface presses against the leading end of the slider;

wherein the slider includes a convex portion, and the inclined surface urges an edge of the convex portion with a force perpendicular to the inclined surface wherein a horizontal component of the force outwardly pushes the slider and a vertical component of the force downwardly presses against the edge of the convex portion of the slider;

wherein a leaf spring is provided between the rod and the slider, the leaf spring including one end fixed in an inner top wall of the groove and another end downwardly pressing against the slider.

6. The ejection mechanism as claimed in claim 5, wherein the inclined surface and a top surface of the recess forms an obtuse angle.

7. The ejection mechanism as claimed in claim 5, wherein the cam channel is heart-shaped.

8. The ejection mechanism as claimed in claim 7, wherein the channel forms a plurality of steps and notches for allowing the pin of the slider to nonreversingly move therein.

* * * * *